(12) United States Patent
Zhang et al.

(10) Patent No.: US 9,029,036 B2
(45) Date of Patent: May 12, 2015

(54) SYSTEMS AND METHODS FOR CONTROLLING A COMPRESSOR RECIRCULATION VALVE

(71) Applicant: GM Global Technology Operations LLC, Detroit, MI (US)

(72) Inventors: Yanyan Zhang, Victor, NY (US); Joseph Mussro, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/660,020

(22) Filed: Oct. 25, 2012

(65) Prior Publication Data

US 2014/0120444 A1 May 1, 2014

(51) Int. Cl.
*H01M 8/04* (2006.01)
*B60L 11/18* (2006.01)

(52) U.S. Cl.
CPC ....... *B60L 11/1881* (2013.01); *H01M 8/04992* (2013.01); *H01M 8/04097* (2013.01); *H01M 8/04395* (2013.01); *H01M 8/04656* (2013.01); *H01M 8/04753* (2013.01); *H01M 2250/20* (2013.01); *Y02E 60/50* (2013.01); *Y02T 90/32* (2013.01); *Y02T 90/34* (2013.01)

(58) Field of Classification Search
CPC ..................... H01M 2250/20; H01M 8/04097; H01M 8/04395; H01M 8/04656; H01M 8/04753; H01M 8/04992; H01M 8/04089; H01M 8/04776; H01M 85/04395; H01M 8/04268; H01M 2008/1095; H01M 8/04111; H01M 8/04365; H01M 8/04014; H01M 8/04223; H01M 8/0494; H01M 8/04947; H01M 8/0687; H01M 16/006; H01M 8/04007; H01M 12/005; H01M 2008/1293; H01M 2250/402; H01M 8/04067; H01M 8/04201; H01M 8/0432; H01M 8/04373; H01M 8/04425; H01M 8/04619; H01M 8/04701; H01M 8/0662; H01M 2250/10; H01M 2250/30; H01M 8/0232; H01M 8/0267; H01M 8/04119; H01M 8/04156; H01M 8/04231; H01M 8/04253; H01M 8/04388
See application file for complete search history.

(56) References Cited

U.S. PATENT DOCUMENTS

| 6,815,106 | B1 * | 11/2004 | Salvador et al. ............... 429/427 |
| 2001/0045209 | A1 * | 11/2001 | Balekai et al. ............ 123/568.12 |
| 2004/0161647 | A1 * | 8/2004 | Rainville et al. ................. 429/25 |
| 2005/0095474 | A1 * | 5/2005 | Rainville ......................... 429/22 |
| 2005/0100777 | A1 * | 5/2005 | Gurin et al. ...................... 429/38 |
| 2005/0136304 | A1 * | 6/2005 | Pettit et al. ....................... 429/26 |
| 2008/0152969 | A1 * | 6/2008 | Poonamallee et al. .......... 429/17 |
| 2008/0209807 | A1 * | 9/2008 | Tsangaris et al. ................. 48/89 |
| 2009/0325010 | A1 * | 12/2009 | Kirklin ........................... 429/22 |
| 2011/0088674 | A1 * | 4/2011 | Shutty et al. ............. 123/568.21 |

OTHER PUBLICATIONS

Non-Final Office Action dated Dec. 16, 2013 pertaining to U.S. Appl. No. 13/660,083, filed Oct. 25, 2012.

* cited by examiner

*Primary Examiner* — Patrick Ryan
*Assistant Examiner* — Jose Colucci Rios
(74) *Attorney, Agent, or Firm* — Dinsmore & Shohl LLP

(57) ABSTRACT

Systems and methods to control compressor recirculation of a reactant in a fuel cell system. A recirculation valve flow setpoint value for a gas flow to the recirculation valve is calculated based on a received cathode flow setpoint. A value corresponding to a predicted recirculation valve position is generated, and can be used as a control command for changing the position of the recirculation valve to reduce the valve response time during operational transients of the fuel cell system.

20 Claims, 6 Drawing Sheets

SYSTEMS AND METHODS FOR CONTROLLING A COMPRESSOR RECIRCULATION VALVE

BACKGROUND OF THE INVENTION

The present application relates generally to controlling a compressor recirculation valve in a vehicle fuel cell system, and more particularly to systems and methods for controlling a compressor recirculation valve to help meet a fuel cell stack cathode flow setpoint, especially during transient operating conditions.

Automotive technology is rapidly expanding in the area of finding alternatives to using gasoline as the primary source of energy in vehicle propulsion systems. One area of interest in recent years has focused on utilizing gaseous reactants as fuel. Gases, such as hydrogen, provide a promising alternative to gasoline because of their abundance in nature. In some vehicular systems, propulsion may be achieved by using hydrogen gas as part of a chemical reaction within a fuel cell to generate electrical energy that can be used to power an electric motor. The generated electricity can then be used to propel the vehicle through the motor, either alone or in conjunction with a petroleum-based combustion engine. Such fuel systems also typically produce less pollution than petroleum-based ones.

In a typical fuel cell, hydrogen or another reactant gas is supplied to the anode of the fuel cell, where the hydrogen is broken into electrons and positively charged ions. An electrolyte layer separates the anode from the cathode, allowing the ions to pass to the cathode, while preventing electrons from passing to the cathode. Instead, electrons are routed around the electrolyte layer through a load and back to the cathode, allowing electrical power to be harnessed. At the cathode, the ions, electrons, and supplied oxygen or air are typically combined to produce water and heat. Individual fuel cells may be arranged in series or parallel as a fuel cell stack in order to produce a higher voltage or current yield. Furthermore, still higher yields may be achieved by combining more than one stack.

In a vehicle utilizing fuel cell technology, these reactant gases may be transported and used within a pressurized gas system. For example, stored hydrogen may be provided to a fuel cell anode and chemically reacted to generate an electrical current. Similarly, air may be received by an air intake and provided to the cathode of a fuel cell. Such vehicle fuel cell systems require the use of compressors to perform such pressurizing function, and may additionally include ancillary equipment such as valves, controllers or the like to regulate the flow of a reactant gas between the compressor and fuel cell.

An inherent attribute of such compressors (at least as they relate to cathode-side operation) is that the cathode's pressure control and flow control are coupled together. Such coupling tends to destabilize system operation, especially during periods of transient system operation. These concerns are particularly acute during transient operating conditions, where both the flow setpoint and the pressure setpoint may exhibit near-instantaneous changes. Even more particularly, the difficulties of ensuring proper recirculation flow are especially acute during downtransient operation, as the inertial effects of a compressor being asked to slow down prevent the compressor speed from dropping as fast as needed; this in turn has a propensity for causing a recirculation flow mismatch. Because the water production in a fuel cell stack varies with current, a downtransient event (where the stack current is suddenly reduced) causes a concomitant rapid drop of the water production. If stack cathode air flow is not reduced along with this current reduction, the stack will quickly dry out, resulting in damage to it. Likewise, the mismatch can also be due to not enough flow being delivered to the cathode. In this case, the presence of a recirculation valve may cause too much recirculation may take place, which results in stack flooding. As such, merely having a recirculation valve does not—in and of itself—ensure quick, precise control to avoid both stack overflow dryout and stack underflow flooding.

SUMMARY OF THE INVENTION

The invention disclosed herein works towards stabilizing the system to minimize both the dryout and flooding conditions mentioned above. In one embodiment, a method for controlling a compressor recirculation valve for a vehicle fuel cell system is disclosed, where the recirculation valve fluidly connects the outlet of the compressor to an inlet of the compressor. The method includes receiving as input a stack cathode flow setpoint for a gas flow being supplied to a fuel cell cathode from a compressor output. The method further includes calculating a recirculation valve flow setpoint value (also known as a predicted or desired value) using operational data from the compressor and the stack cathode flow setpoint. The method additionally includes generating a recirculation valve control command that causes the recirculation valve to change positions. By such a method, a compressor flow setpoint can be used to calculate a recirculation flow setpoint by, for example, taking a difference between the compressor flow setpoint and the stack cathode flow setpoint. This provides a predicted recirculation valve flow value.

In one optional form, the method takes place during an operational transient of the fuel cell system. In an even more particular optional form, the operational transient is a downtransient, where the power generated by the fuel cell changes from high to low, as does the need for oxygen or a related cathode reactant being delivered to the fuel cell stack. Thus, in the event of a downtransient, the method may be used to predict the future recirculation valve position needed to meet the new stack cathode flow setpoint, as well as to send a command to the recirculation valve in order to meet such new setpoint. As such, calculations performed in accordance with the present disclosure are preferably used in a predictive capacity to decide a future valve position. Feedforward terms, such as the stack cathode flow setpoint and compressor outlet pressure setpoint, may be used, while other operational parameters (in particular, feedback parameters such as the compressor speed that typically changes relatively slowly) may be used too. Significantly, feedforward control of the compressor recirculation valve helps to stabilize and control this inherently coupled system. In one form, the control described herein may be used in conjunction with feedforward compressor speed control that is addressed in companion application Ser. No. 13/660,073 entitled PREDICTIVE CATHODE COMPRESSOR SPEED CONTROL IN A FUEL CELL POWER SYSTEM which is filed on the same day as the present application and incorporated in its entirety by reference. In the present context, the relative speed with which a component (such as the compressor) changes does not imply a slow transition, but rather that such transition takes place over a length of time that—if not corrected—could lead to deleterious humidity imbalances within the stack. For example, a downtransient for the physical compressor speed from a maximum to a minimum might be about 4 seconds; this is a rather long time for the cathode membranes of the stack to be subjected to the drying effects of the larger airflow. The prompt operation of the recirculation valve as discussed herein meliorates the impact of the excess air flow during this transition period. Compressor operational data may be derived from a compressor map; such data may be placed into a conventional machine-readable form, such as through a lookup table or the like that uses known compressor characteristics provided by the compressor manufacturer. In a particular form, a compressor inlet gas flow setpoint may be the type of operational data that may be determined from the compressor map. In a like manner, the recirculation valve flow setpoint value may be calculated using a difference between the compressor inlet gas flow setpoint and the stack cathode flow setpoint. Likewise, the stack cathode flow setpoint may be generated elsewhere, such as in another algorithm that may be stored on a computer or related controller. In another optional form, the recirculation valve flow setpoint value is used to calculate the new recirculation valve position, which will be treated as a feedforward term for the valve position setpoint. In addition, a proportional-integral-derivative (PID) controller is used to generate the compensational term for the new valve position, which is treated as the feedback term of the new valve position since it is based on the stack cathode flow feedback value and it tries to eliminate the error (or difference) between the stack cathode flow setpoint and the stack cathode flow feedback value. As such, the new valve position is the sum of the feedforward (i.e., open-loop) term and the feedback (i.e., closed-loop) term, and the controller will command the valve with a recirculation valve control command to change the position to the new setpoint. It will be appreciated by those skilled in the art that the new valve position, even though it may utilize feedback information (such as compressor speed or pressure or temperature) may not use flow feedback information since that is the target control term.

In another embodiment, a controller for a vehicle fuel cell system is disclosed. The controller includes at least one processor and a non-transitory memory, where the latter stores machine instructions executed by the former to cause the controller to determine a cathode flow setpoint for gas flow supplied by an outlet of a compressor to a cathode of one or more fuel cells that are used to form a stack of fuel cells in the fuel cell system. A compressor map (which may be stored in RAM or ROM of the memory) that includes data corresponding to the operation of the compressor may be accessed by the processor in order to help it perform one or more calculations pertaining to recirculation valve settings. The instructions also cause the processor to calculate a flow value for the recirculation valve such that gas flow to the recirculation valve from the outlet of the compressor takes into consideration the stack cathode flow setpoint and compressor map data.

Optionally, operational data corresponding to the compressor map is contained within the non-transitory memory. The compressor map data can be accessed by the controller to determine a gas flow setpoint for the compressor inlet. The instructions may also be used to have the processor calculate a difference between the compressor inlet gas flow setpoint and the cathode flow setpoint as a way to determine the value needed for the recirculation valve to be set to. As mentioned above, in addition to the setpoint and related feedforward information, the algorithm used to control valve position may employ feedback terms. Preferably, a control signal generated by the controller can be sent to an actuator in order to reposition the valve in a more open or closed configuration commensurate with the needs of the vehicular fuel cell system.

In another embodiment, a vehicular fuel cell system is disclosed. The system includes a fuel cell including a cathode and a compressor having an inlet and an outlet. The outlet is operatively connected to the cathode of the fuel cell and provides gas to the cathode of the fuel cell. The system also includes a recirculation valve operatively connected to the inlet and the outlet of the compressor. The system further includes a controller having at least one processor and a non-transitory memory in signal communication with the processor. The memory stores instructions that, when executed by the processor, cause the processor to determine a cathode flow setpoint for a gas flow to the cathode. The instructions further cause the processor to use operational data pertaining to the compressor that can be stored in the form of a compressor map. The instructions also cause the processor to calculate a recirculation valve flow value for a gas flow to the recirculation valve using the compressor map and the cathode flow setpoint; this in turn may be used to generate a recirculation valve control command that causes the valve to change positions.

Optionally, the compressor map is used to determine a gas flow setpoint to the compressor inlet. The instructions may further cause the processor to calculate a difference between the compressor inlet gas flow setpoint and the cathode flow setpoint as a way to determine the recirculation valve value, which in an even more particular form, may constitute a feedforward value for the controller. As stated above, the position of the recirculation valve may be determined by the feedforward value, and may additionally be based on one or more of a feedback-based integral value and derivative value. Data communication equipment (for example, signal-carrying wires, connectors or the like) may also form part of the fuel cell system; such equipment may be used to convey the recirculation valve control command between at least the controller and the recirculation valve.

BRIEF DESCRIPTION OF THE DRAWINGS

The following detailed description of specific embodiments can be best understood when read in conjunction with the following drawings, where like structure is indicated with like reference numerals and in which.

Figure 1:
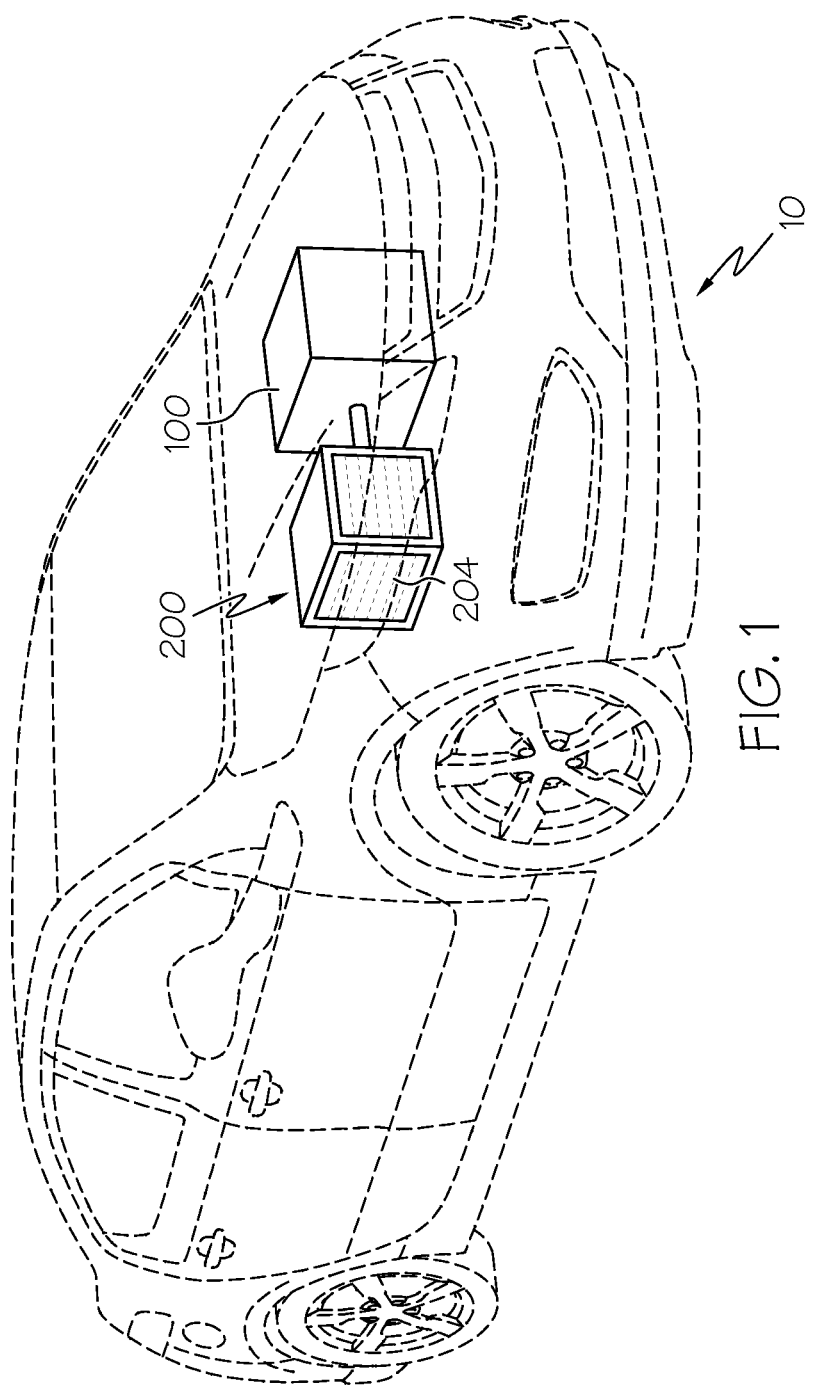
FIG. 1 shows a vehicle having a fuel cell system.

The embodiments set forth in the drawings are illustrative in nature and are not intended to be limiting of the embodiments defined by the claims. Moreover, individual aspects of the drawings and the embodiments will be more fully apparent and understood in view of the detailed description that follows.

DETAILED DESCRIPTION OF THE PREFERRED EMBODIMENTS

As stated above, the use of compressors within vehicular fuel cell systems presents additional challenges for the automotive industry, where flow rate, as well as the related fuel cell cathode stoichiometry, is an important parameter for such a system. Cathode stoichiometry is defined as the ratio of inlet molar flow rate of a reactant to rate of consumption of the reactant, and therefore is directly proportional to gas flow to the cathode. When the output of the fuel cell goes from high power to low power (for example, during an idle state), there is less reactant consumption, which in turn increases the cathode stoichiometry significantly. However, this increase in stoichiometry may dry out the stack and accordingly impact the stack performance or even causes damages to the stack. In any event, providing quick opening and closing of the recirculation valve according to the aspects of the invention will improve the chance of the system to meet the flow setpoint quickly and avoid a stack overstoichiometry condition; these more precise instructions are especially beneficial during downtransient conditions, where the latency associated with compressor speed decreases may otherwise hamper maintaining proper stack stoichiometry.

Referring now to FIG. 1, vehicle 100 is shown, according to embodiments shown and described herein. Vehicle 100 (e.g., a car, bus, truck or motorcycle) is powered by one or more fuel cells that make up fuel cell system 102 that converts stored gaseous fuel into electric power for engine 104. In a preferred embodiment, fuel cell system 102 is a hydrogen-based fuel cell system that converts a catalytic reaction between hydrogen gas and oxygen into electric current. Fuel cell system 102 may include one or more onboard hydrogen storage tanks or related storage tanks (neither of which are shown), the latter such that onboard reformation of a hydrogen gas precursor may take place. In such a case, fuel cell system 102 may also include any number of valves, compressors, tubing, temperature regulators, electrical storage devices (e.g., batteries, ultra-capacitors and the like, none of which are shown) and controllers to help ensure proper operation of fuel cell system 102. Engine 104 may be a fully electric or a hybrid electric engine (e.g., an engine that uses both electricity and petroleum-based combustion to propel vehicle 100). In either configuration, engine 104 utilizes the power from fuel cell system 102 for at least a portion of the propulsion needs of vehicle 100.

Any number of different types of fuel cells may be used in fuel cell system 102 (e.g., metal hydride fuel cells, alkaline fuel cells, electrogalvanic fuel cells or any other type of known fuel cells). Multiple fuel cells may also be combined in series or parallel within fuel cell system 102 as a fuel cell stack in order to produce a higher voltage or current yield by fuel cell system 102. The produced electrical power may then be supplied directly to engine 104 or stored within an electrical storage device for later use by vehicle 100.

Figure 2:
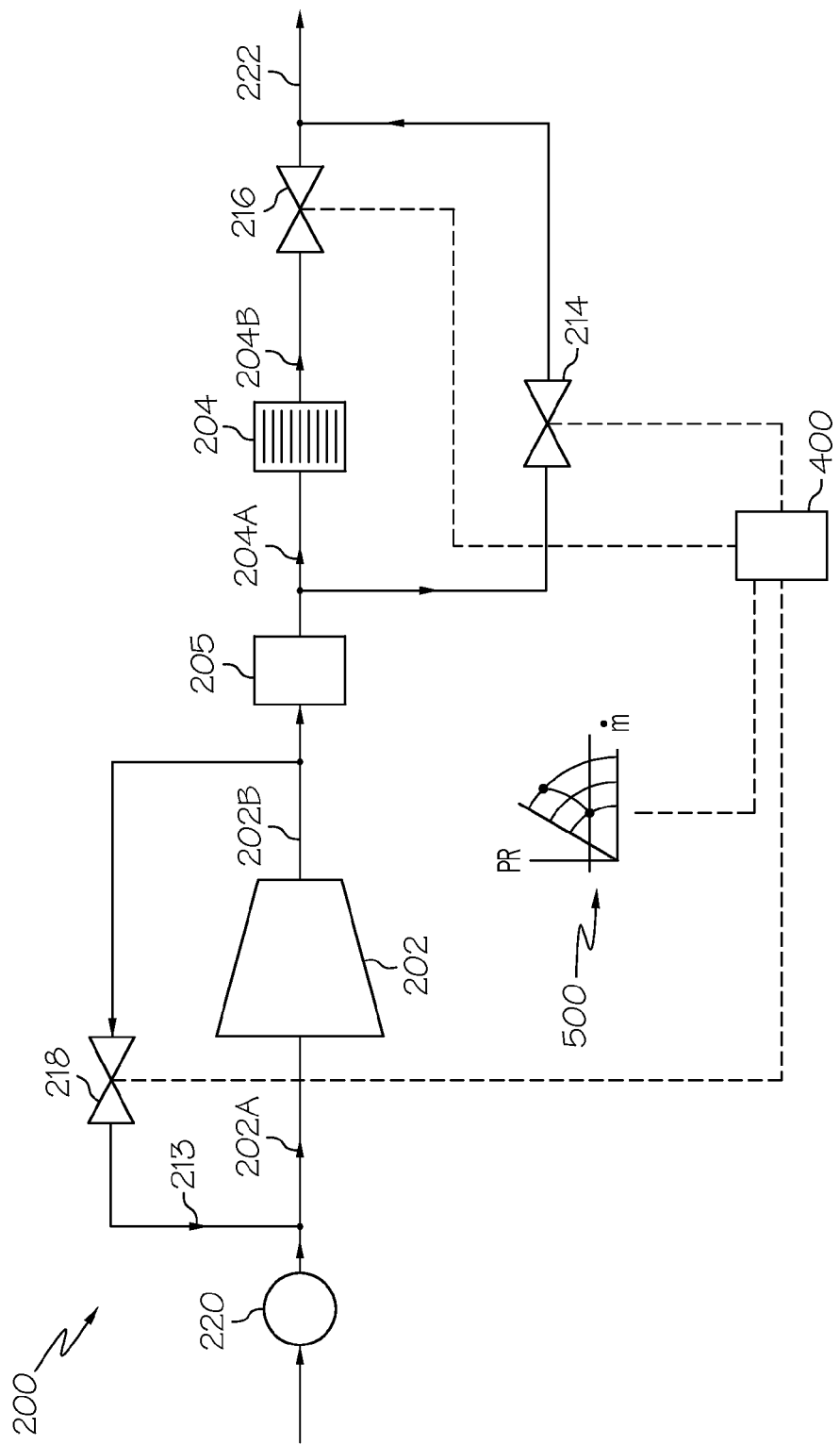
FIG. 2 is a schematic illustration of the air supply system in the vehicle fuel cell system shown in FIG. 1.

Referring now to FIG. 2, a schematic illustration of fuel cell system 102 is shown, according to embodiments shown and described herein. Compressor 202 receives air at inlet 202A, compresses it, and provides the supplied gas via outlet 202B to cathode inlet 204A of fuel cell stack 204, where the gas is used to produce electrical power for vehicle 100. Exhaust gas or liquids are then removed from cathode outlet 204B via exhaust 222. In addition to compressor 202, fuel cell system 102 also includes a number of valves that help to regulate the flow of gas throughout the system. For example, fuel cell system 102 may include a bypass valve 214 that allows some or all of the gaseous fuel to bypass fuel cell stack 204. Fuel cell system 102 may also include cathode backpressure valve 216 that regulates the flow of exhaust from cathode outlet 204B. Cathode backpressure valve 216 may be used, for example, to control the pressure and flow of gas through the cathode. Recirculation valve 218 allows for selective fluid connection between compressor outlet 202B and inlet 202A. An especially valuable use for recirculation valve 218 is during operational transients in the fuel cell stack 204, where it can increase or decrease the amount of air present at the inlet 206 depending on the transient needs of the stack 204.

Fuel cell system 102 further includes a number of sensors that measure the characteristics of the gas within the system. For example, fuel cell system 102 may include flow meter 220 that measures the mass air flow from the air intake system. Other non-limiting examples of sensors (not shown) in fuel cell system 102 include sensors that measure the mass air flow, pressure, temperature, density or the like, of the gas or gases used in fuel cell system 102. Further examples include sensors that measure the position of valves 214, 216, 218 and the speed of compressor 202.

A downtransient can occur in the fuel system 102, meaning the output of the fuel cell stack 204 shifts to a lower power setting based on a request from an operator of vehicle 100. In one example, a lower power setting may correspond to idle state operation of vehicle 100. In order to maintain stability of stack 204, the cathode stoichiometry must be increased, but in such a way as to not adversely impact other operational parameters of stack 204. According to the present disclosure, the recirculation valve 218 can be opened at outlet 202B of compressor 202. It is to be noted that control over one device in the system 102 may be integrated into the control over another device. For example, a setpoint may be used to control several valves of the system 102. In a more particular form, an algorithm used as part of the present disclosure may help determine a flow setpoint for compressor 202 that is to be used to calculate the recirculation flow setpoint that would be equal to the difference between the flow setpoints of compressor 202 and the stack 204. The logic of the present method of controlling recirculation valve 218 is especially beneficial when used in conjunction with power downtransients in fuel cell system 102. In one form, the compressor flow setpoint information may be derived from a compressor map 500.

Figure 3:
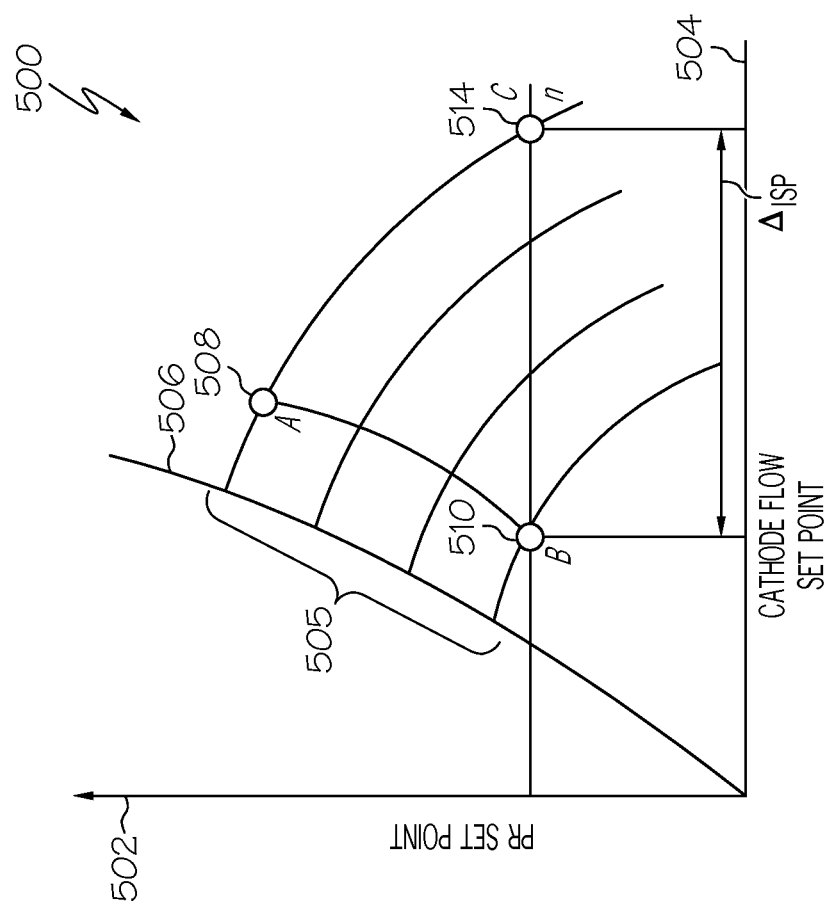
FIG. 3 is an illustration of a compressor map.
Figure 4:
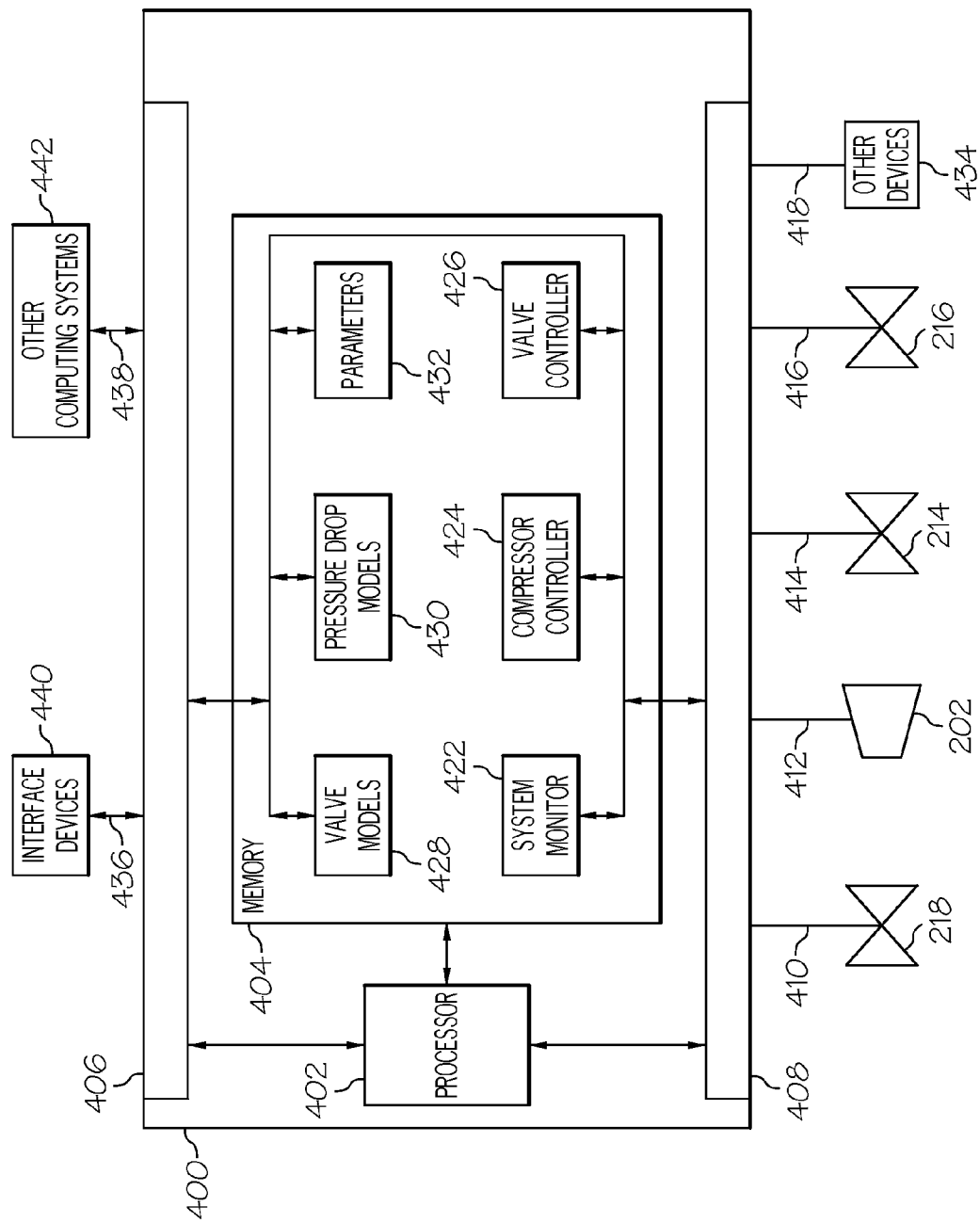
FIG. 4 is a schematic illustration of a controller for the vehicle fuel cell system of FIG. 1.

Referring now to FIGS. 3 and 4, more details associated with compressor map 500 and the various features of controller 400 are shown. Referring with particularity to FIG. 3, data contained in the compressor map 500 is that which corresponds to the operation of the compressor 202; such information may include pressure ratios for given flow conditions (including, for example, factors pertaining to mass flow that may additionally take into consideration atmospheric temperature and pressure variations) at various speed lines 505. Compressor maps 500 provide a useful tool to predict the behavior of compressor 202 by allowing the prediction of flow setpoints based on the operating state of the compressor 202. Typically, a compressor map 500 relates the pressure ratio 502 to the flow 504 of the gas through the compressor 202. A surge line 506 delimits those compressor 202 operating states that result in stalls, flow reversals and other undesirable surge condition from those that do not, where points to the left of surge line 506 are problematic, while operating points to the right of surge line 506 correspond to generally normal compressor 202 operation. The distance between an operating point 508, 510 or 514 (discussed in more detail below) of the compressor 202 and surge line 506 is referred to as the surge margin, and provides a measure of how close the compressor 202 is to a surge condition. In one form, the data that corresponds to the various operational conditions across the compressor map 500 may be stored in a lookup table or related data structure that may in turn be embedded or otherwise contained within any suitable machine-accessible medium, such as a preprogrammed chip or memory device, flash memory, hard disk drive, CD, DVD, floppy disk or related non-transitory structure. Thus, such machine-accessible medium may be in the form of a memory 404 that forms part of the controller 400. The data in the compressor map 500 may be pre-loaded into the controller 400 using information provided by, for example, the manufacturer of the compressor 202. In another form, the data can be built using a diagnostic routine that varies the operation of the compressor 202 and detects various conditions; either form is acceptable. In addition to the feedforward setpoint parameters mentioned above, the compressor 202 may be additionally controlled by one or more feedback loops in order to regulate its speed, differential pressure, gas flow rate or related parameters in order to try to maintain the one or more setpoints.

As mentioned above, points 508, 510 and 514 illustrate various operating conditions (or points) that may be experienced by the compressor 202. For example, the compressor 202 is operating at a feedback speed at point 508. If the output of the fuel cell system goes to low power, a downtransient condition may exist. The compressor 202 speed may then be controlled to point 510 in order to conserve resources, as both the x-axis flow rate 504 and y-axis pressure ratio 502 experience a corresponding decrease. Likewise, the compressor 202 speed may be controlled along one of the constant speed lines 505 to point 514, as the rotational speed of compressor 202 goes down slowly during a downtransient condition. In such a circumstance, the gas flow setpoint of the compressor inlet 202A at point 514 is determined by the pressure ratio setpoint 502 and the feedback speed at point 508. The recirculation valve 218 flow setpoint value can be calculated from the difference between the gas flow setpoint of the compressor inlet 202A and the cathode flow setpoint shown at point 510. The recirculation valve 218 can then be opened to reroute any surplus air flow rather than have such air pass through the cathode of stack 204 where, as stated above, it could result in a mismatched stoichiometry for stack 204. As will be understood by those skilled in the art, a preferred maximum operating point "A" for the compressor 202 is at the top of the uppermost of speed lines 505 that intersects with point 508. The inertia within compressor 202 makes it hold its last speed for a bit of time during the downtransient; this causes the compressor flow to trend towards operation point "C" at point 514 on the map 500.

With regard to the particular example shown in FIG. 3, a transient condition from point 508 (high power) to 510 (lower power) on the map 500 means the stack cathode flow setpoint correspondingly changes; likewise the compressor outlet 202B pressure setpoint is changed as shown as moving from point 508 to point 510. Since the flow setpoint is changed, the position of the recirculation valve 218 to meet the new flow request at point 510 needs to be predicted and then promptly adjusted. Because compressor 202 running characteristics are already known (and—as mentioned above—generally slowly-changing, especially over the duration of the downtransient) by following certain characteristics, the compressor map 500 may be used to predict the recirculation valve 218 position with the simplifying assumption that the speed of compressor 202 is unchanged over the course of a single time step. Additional operational knowledge may also be relied upon. For example, knowing that the pressure at compressor outlet 202B will drop if the recirculation valve 218 is opened allows opening the recirculation valve 218 to the predicted position so that the compressor can run at the point 514. The flow of air to be bypassed by the recirculation valve 218 in order to meet the new stack cathode flow setpoint 514 is equal to the difference between it and point 510.

From this, the feedforward term of the new recirculation valve 218 position is then determined by a general valve model by using the flow through the valve (i.e., the difference between the x-axis points at points 514 and 510), the flow temperature, the pressure at the valve 218 inlet and outlet, as well as other necessary inputs. Together with the feedback term determined from the PID controller, the new position of the recirculation valve 218 is finally determined after which recirculation valve 218 will be instructed to move to the new position and the compressor 202 will run at point 514 while its pressure at the outlet 202B will be dropped to the pressure at setpoint 514. Under such an exemplary move, the compressor 202 flow is indicated at point 514, while the fuel cell stack 204 flow is at point 510. Accordingly, the bypassed (i.e., through the recirculation valve 218) flow is the difference between points 514 and 510, shown as $\Delta_{ISP}$. From this, the decrease of the rotational speed of compressor 202 results in its operating condition moving from point 514 to point 510. During this process, the stack 204 flow and pressure both continue to meet the new setpoint 510. The feedforward term of the new valve position ensures to open the valve 218 quickly during downtransient and close quickly during uptransient, while the feedback term of the new valve position from the PID controller 400 can eliminate any offset error or mitigate any overshoot during a transient condition. The method of the present disclosure will make the transient happen more quickly thereby avoiding drying out the stack 204. An important side benefit of the recirculation valve 218 is that it helps prevent the compressor 202 from running into the aforementioned surge condition treatment of which is addressed in companion application Ser. No. 13/660,083 entitled REACTIVE COMPRESSOR SURGE MITIGATION STRATEGY FOR A FUEL CELL POWER SYSTEM and filed on the same day as the present application. If the system 102 is in steady state, the recirculation valve 218 will move to a position based on surge control to prevent the compressor 202 from moving above surge line 506. The valve 218 will recirculate a minimum flow rate while the compressor 202 stays at the lowest necessary speed to achieve the desired flow.

Referring with particularity to FIG. 4, controller 400 for regulating operation of compressor recirculation valve 218 includes a processor 402, which may be at least one processor (e.g., a microprocessor, an application specific integrated circuit (ASIC), field programmable gate array, or the like) is communicatively coupled to memory 404 and interfaces 406 and 408 (which may correspond to input and output steps, respectively). Processor 402 can (among other things) determine a cathode flow setpoint for gas flow supplied by compressor 202 to fuel cell stack 204, where the cathode flow setpoint corresponds to a desired operating condition of the stack 204, and the desired operating condition may be calculated at different modes. The desired operating condition may be communicated to a memory 404 for storage of the condition. In one form, the desired operating condition may be stored in a memory 404 as a lookup table, data structure or related configuration. Memory 404 may be any form of memory capable of storing machine-executable instructions that implement one or more of the functions disclosed herein, when executed by processor 402. For example, memory 404 may be a RAM, ROM, flash memory, hard drive, EEPROM, CD-ROM, DVD, other forms of non-transitory memory devices, or any combination of such memory devices. The controller 400 may also include one or more of digital signal processing capability, application specific integrated circuitry, programmable logic devices as well as discrete gate or transistor hardware components. In this way, the controller 400 may generate and store non-transitory signals that can be used to control recirculation valve 218 positioning through one or more of the feedforward values mentioned above, as well as from feedback (i.e., integral/derivative) terms. System operation can be affected through valve 218 opening or closing in response to the valve control command from controller 400.

In a preferred form, at least a portion of controller 400 is configured to function as a feedforward-based device, in that the operation of one or more of the valves shown in FIG. 2 in the system (including recirculation valve 218) is based on mathematical models or related characterization of the fuel cell system 102, where program elements corresponding to such models can be loaded into memory 404. In this way, by combining the mathematical model of the operation of parts or all of the fuel cell system 102 into the algorithm in controller 400, appropriate control actions may be taken by the controller 400 based on known system parameters (such as those being sensed, measured or otherwise fed into the algorithm). As stated above, optimization of the operation of fuel cell system 102 may be enhanced by combining feedforward elements with some feedback-based elements, as the feedforward control is preferred for quickness in transitions, while the feedback is needed to reduce minor steady state errors.

Controller 400 communicates with various devices in fuel cell system 102 and, in some cases, provides either direct or indirect control over devices such as recirculation valve 218, compressor 202 and other components. Controller 400 also receives, either directly or indirectly, sensor measurements from fuel cell system 102 to monitor the operation of the system. For example, controller 400 may receive temperature, pressure, flow, density, valve position, speed or other measurements from sensors associated with compressor 202, recirculation valve 218, or the like. In addition, controller 400 may also receive sensor readings from other devices (such as flow meter 220, sensors associated with other valve 214, 216 or the like). It should be appreciated that any number of different combinations of sensors and sensor configurations may be used, without deviating from the principles or teachings of the present disclosure.

Connections 410, 412 and 414 may be any combination of hardwired or wireless connections that provide connections between controller 400 and compressor 202, recirculation valve 218, cathode backpressure valve 216, bypass valve 214 and other devices. In some embodiments, connections 410, 412 and 414 are part of a shared data line that conveys measurement data to controller 400 and control commands to the devices of fuel cell system 102 connected to controller 400. In yet other embodiments, connections 410, 412 and 414 may include one or more intermediary circuits (e.g., other microcontrollers, signal filters, etc.) and provide an indirect connection between controller 400, compressor 202, recirculation valve 218 and other devices 434.

Interface 408 is configured to receive measurement data and to transmit control commands to recirculation valve 218, compressor 202, and other devices. For example, interface 408 may include one or more wireless transceivers, if any of connections 410, 412 and 414 are wireless connections. Interface 408 may also include one or more wired ports, if any of connections 410, 412 and 414 are wired connections. Interface 408 may also include circuitry configured to digitally sample or filter received measurement data. For example, interface 408 may sample temperature data received from a temperature sensor of compressor 202 via connection 412 at discrete times (e.g., k, k+1, k+2, etc.) to produce discrete temperature values (for example, T(k), T(k+1), T(k+2), etc.).

In some embodiments, controller 400 may also communicate with interface devices 440 (e.g., a display, a speaker, a printer, or any other electronic device that provides or receives data to and from a user) via connection 436. Controller 400 may also communicate with other computing systems 442 (e.g., another controller, a portable electronic device, a server, or the like) via connection 438. Connections 436 and 438 may be wired or wireless connections. For example, other computing systems 442 may include a server located remotely from vehicle 100 and connection 422 may be a wireless connection. For example, server 400 may communicate status condition information to the server via a cellular, WiFi, radio, satellite connection, or the like. Interface 406 may also include one or more transceivers configured to send and receive location information for vehicle 100. For example, interface 406 may include a GPS receiver or cellular receiver that utilizes triangulation to determine the location of vehicle 100. In other embodiments, interfaces 406 and 408 may be a single interface for controller 400.

Controller 400 uses the setpoints for the pressure ratio, surge margin or flow rate to regulate recirculation valve 218, as well as the other valves. For example, controller 400 may determine a requested valve position for recirculation valve 218 that moves the operating state of compressor 202 away from the surge line of compressor map 50. Controller 400 then generates a recirculation valve control command that causes recirculation valve 218 to open or close accordingly.

Parameters 432 that may alter the functions of controller 400 may include one or more threshold values for the speed of compressor 202, temperature thresholds, or a surge condition time limit. These parameters 432 may also include values that enable or disable functions of controller 400. For example, such parameters 432 may include those that determine if surge mitigator is active. Likewise, the parameters 432 may further include values that determine how information about fuel cell system 102 is conveyed to interface devices 440 or to other computing systems 442 (for example, how often, what format, and the like).

In some cases, some or all of parameters 432 may be pre-loaded into memory 404 (e.g., by the manufacturer of controller 400, the manufacturer of vehicle 100, or the like). In other cases, some or all of parameters 432 may be provided to controller 400 via interface devices 440 or other computing systems 442. Further some or all of parameters 432 may be updated or deleted via interface devices 440 or other computing systems 442.

Although controller 400 is shown as a singular device, it is to be understood that this is merely exemplary and is not intended to be limiting. For example, processor 402 may include any number of processors of any number of computing devices that execute the instructions stored in memory 404. Likewise, memory 404 may include any number of memory devices and is not limited to memory devices located within the same housing as processor 402. In some cases, processor 402 or memory 404 may even be located external to vehicle 100.

Recirculation valve 218 flow setpoint value is calculated using the compressor map 500 and the cathode flow setpoint. As stated above, this flow setpoint value corresponds to a predicted flow, and all such calculations are for the prediction. By being a predictive parameter, this flow value has the ability to reduce the time and uncertainty associated with operational transients. A compressor inlet 202A gas flow setpoint is determined by the compressor map 500 at a speed and pressure ratio across the compressor 500. For example, the compressor pressure ratio setpoint $PR^{Sp}$ may be calculated as:

$$PR^{Sp} = \frac{p_{CmprOut}^{Sp}}{p_{CmprIn}^{Sp}}$$

where $p_{CmprOut}^{Sp}$ is the pressure setpoint at the outlet 202B of the compressor 202 and $p_{CmprIn}^{Sp}$ is the pressure setpoint at the inlet 202A of the compressor 202. The corrected gas flow setpoint of compressor inlet 202A is determined through the compressor map 500 as follows:

$$\dot{m}_{CmprDchrg}^{SpCrtd} = \text{Map}_{Cmpr}(nn_{Cmpr}^{Crtd}, PR^{Sp})$$

where $\dot{m}_{CmprDchrg}^{SpCrtd}$ is the corrected compressor inlet gas flow setpoint determined from speed and pressure ratio across the compressor 202. The final compressor inlet 202A gas flow setpoint is converted from the corrected value:

$$\dot{m}_{CmprDchrg}^{Sp} = \dot{m}_{CmprDchrg}^{SpCrtd} * \frac{p_{CmprIn}}{p_{ref}} * \sqrt{\frac{T_{ref}}{T_{CmprIn}^{Sp}}}$$

where $T_{CmprIn}^{Sp}$ is the temperature setpoint at the compressor inlet 202A from the recirculation valve 218. The recirculation valve 218 flow value is calculated using a difference between the final compressor inlet 202A gas flow setpoint ($\dot{m}_{CmprDchrg}^{Sp}$) (and the stack cathode flow setpoint ($\dot{m}_{CmprAssmDchrg}^{Req}$).

$$\dot{m}_{RcrcVlv}^{sp} = \dot{m}_{CmprDchrg}^{Sp} - \dot{m}_{CmprAssmDchrg}^{Req}$$

The recirculation valve 218 flow setpoint value ($\dot{m}_{RcrcVlv}^{sp}$) is truncated to zero if the final compressor inlet 202A gas flow setpoint ($\dot{m}_{CmprDchrg}^{Sp}$) is less than the stack cathode flow setpoint ($\dot{m}_{CmprAssmDchrg}^{Req}$).

The requested valve kVlv value for the feedforward term of the recirculation valve 218 position is calculated based on the valve model for subcritical gas flow as:

$$kVlv_{CmprRcrcVlv}^{Req, Subcrtcl} = a * \frac{\dot{m}_{RcrcVlv}^{sp}}{M_{CaSplyAir}} * \sqrt{\frac{M_{CaSplyAir} * T_{CmprOut}}{\left(p_{CmprOut}^{Sp}\right)^2 - \left(p_{CmprIn}^{Sp}\right)^2}}$$

and calculated as follows for critical gas flow as:

$$kVlv_{CmprRcrcVlv}^{Req, Crtcl} = b * \frac{\dot{m}_{RcrcVlv}^{sp}}{M_{CaSplyAir}} * \sqrt{\frac{M_{CaSplyAir} * T_{CmprOut}}{\left(p_{CmprOut}^{Sp}\right)^2}}$$

where $M_{CaSplyAir}$ is the molecular weight of the gas through the recirculation valve 218, $\dot{m}_{RcrcVlv}^{SP}$ is the flow bypassed by the recirculation valve 218 calculated previously, $T_{CmprOut}$ is the temperature at the outlet 202B of the compressor 202, $p_{CmprOut}^{Sp}$ is the pressure setpoint at the outlet 202B of the compressor 202, $p_{CmprIn}^{Sp}$ is the pressure setpoint at the inlet 202A of the compressor 202, and a and b are the coefficients from the unit conversion for the subcritical and critical gas flow, respectively. In some embodiments, a and b are equal to 4.633 and 5.375, respectively. The maximum of the subcritical and critical gas flow values can then be used as the requested position of the recirculation valve 218:

$$kVlv_{CmprRcrcVlv}^{Req} = \text{Max}(kVlv_{CmprRcrcVlv}^{Req, Subcrtcl}, kVlv_{CmprRcrcVlv}^{Req, Crtcl})$$

The final kVlv value of the valve 218 is calculated from the feedforward kVlv value calculated above and the feedback kVlv from the PID controller 400 and it is converted to the new valve position through a lookup table or other method based on the valve characteristic. The recirculation valve command is then generated and sent through interfaces 406 that cause the recirculation valve 218 to change positions. The command is generated by one or both of a feedback-based (i.e., an integral-derivative) value and a feedforward-based (i.e., setpoint) value that is particularly well-suited to quick transient flow response.

By the above valve equations, the predicted position of recirculation valve 218 as a feedforward term to the PID controller 400 is calculated based on a valve model with the input of predicted flow, temperature, pressure and other inputs. In a particular form, the invention uses the information stored in the compressor map 500 to calculate the feedforward term of the position of valve 218, which upon instruction from controller 400 can make the valve 218 move quickly during down or up transients compared with a purely feedback-based control strategy. It will be appreciated by those skilled in the art that the above equations are exemplary, and that other equations may be used to produce the predicted position of valve 218; such other equations, to the extent that they are used to help predict future recirculation valve 218 position to meet the flow setpoint of fuel cell stack 204, are within the scope of the present disclosure.

Figure 5B:
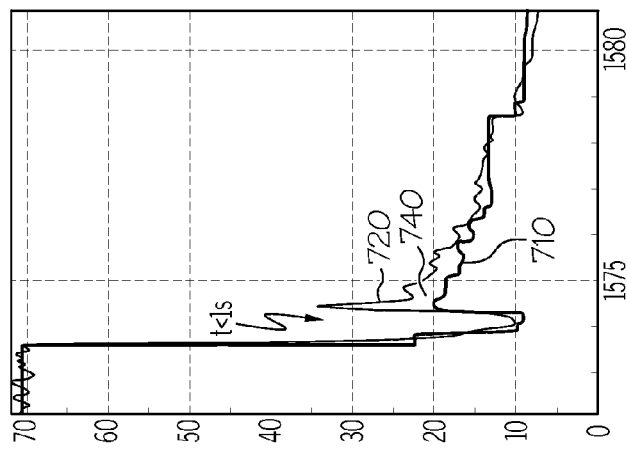
FIG. 5B shows a flow control for a downtransient according to the present disclosure.
Figure 5B:
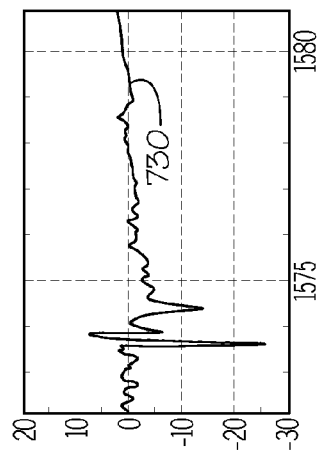
Figure 5A:
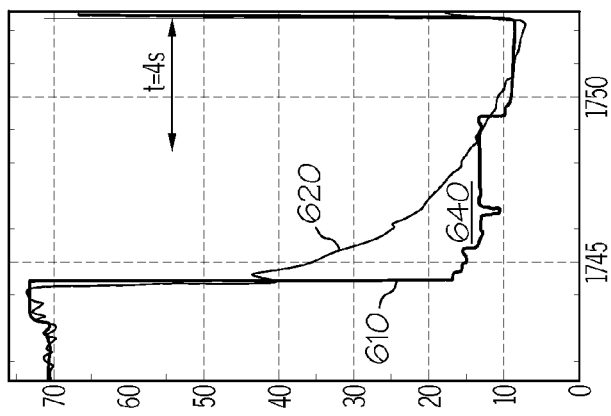
FIG. 5A shows a flow control for a downtransient according to the prior art.
Figure 5A:
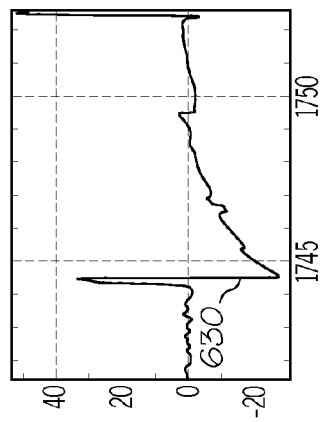
Figure 6B:
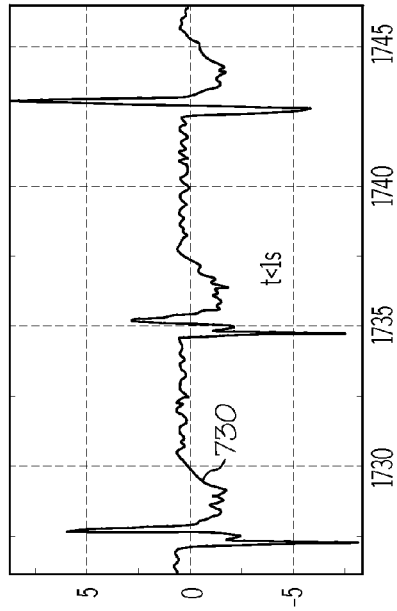
FIG. 6B shows a flow control for an uptransient according to the present disclosure.
Figure 6B:
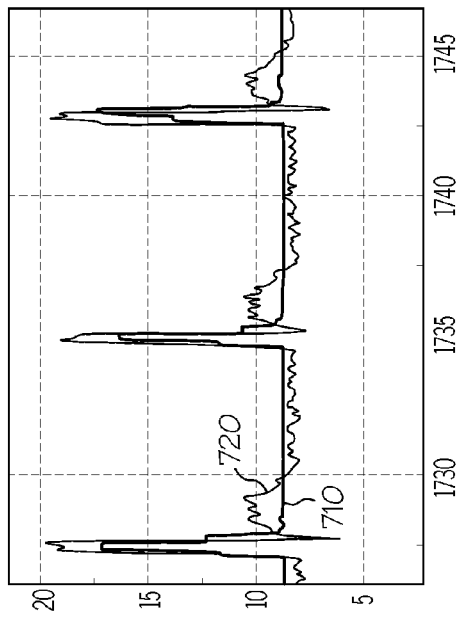
Figure 6A:
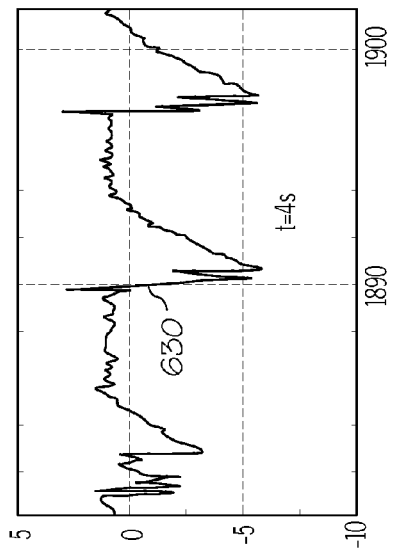
FIG. 6A shows a flow control for an uptransient according to the prior art.
Figure 6A:
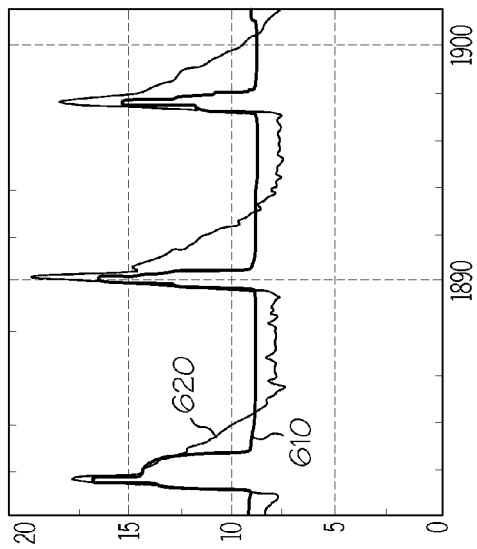

Referring next to FIGS. 5A, 5B, 6A and 6B, results of recirculation valve flow control according to the prior art (FIGS. 5A and 6A) and the present disclosure (FIGS. 5B and 6B) are shown. Referring with particularity to FIG. 5A, differences in the stack flow setpoint 610 and stack flow feedback 620 show up as error 630, while the dryout area 640 between the stack flow setpoint 610 and stack flow feedback 620 is large for a significant amount of time (approximately 4 seconds as shown); this can lead to a drying out of the various cathodes of stack 204 of FIG. 2. Referring with particularity to FIG. 5B, the differences in the stack flow setpoint 710 and stack flow feedback 720 are resolved promptly; this in turn means that the dryout area 740 is minimized, which equates to reduced cathode dryout, and improved stack performance and durability. Referring with particularity to FIG. 6A, the cathode stack flow setpoint 610 momentarily increases, followed by a quick decrease. This is done in conjunction with anode hydrogen bleed events where anode water and nitrogen are momentarily "burped" from the system. Similar to FIG. 5A, FIG. 6A shows dryout areas 640 for the cathode where the stack flow setpoint 610 and feedback 620 are separated, whereas in FIG. 6B, the disclosed invention remedies the situation by having setpoint 710 and stack flow feedback 720 correlate much better, thereby reducing the dryout area 740.

While the present disclosure has been particularly shown and described with reference to specific embodiments, it should be understood by those skilled in the art that various changes in form and detail may be made therein without departing from the spirit and scope of the disclosure as defined by the appended claims.

What is claimed is:

1. A method for controlling fuel cell system cathode stoichiometry during an operational transient with a compressor recirculation valve, the method comprising:
   identifying an operational transient in a fuel cell stack;
   receiving a stack cathode flow setpoint for gas flow supplied by an outlet of a compressor to a cathode of said fuel cell stack;
   calculating a recirculation valve flow setpoint value for said supplied gas flow using compressor operational data and said stack cathode flow setpoint;
   calculating a feedforward term corresponding to a new recirculation valve position by using said recirculation valve flow setpoint value;
   generating a feedback term corresponding to said new recirculation valve position through a PID control strategy based on an error between said stack cathode flow setpoint and said feedback term; and generating a recirculation valve control command based on said feedforward term and said feedback term that causes actuation of said recirculation valve to maintain cathode stoichiometry during said operational transient.

2. The method of claim 1, wherein said operational transient is an operational downtransient.

3. The method of claim 2, wherein a compressor inlet gas flow setpoint is determined from a compressor map.

4. The method of claim 3, wherein said recirculation valve flow value is calculated using a difference between said compressor inlet gas flow setpoint and said cathode flow setpoint.

5. The method of claim 1, further comprising using a controller for at least one of said receiving, calculating and generating.

6. The method of claim 1, further comprising using a controller for said generating said feedback term.

7. The method of claim 1, further comprising opening or closing said recirculation valve in response to said generated recirculation valve control command.

8. A vehicular fuel cell system cathode stoichiometry controller comprising:
at least one processor; and
a non-transitory memory in communication with said at least one processor, wherein said memory stores machine instructions that, when executed by said at least one processor, cause said at least one processor to:
identify an operational transient in a vehicle fuel cell stack;
receive a stack cathode flow setpoint for gas flow supplied by an outlet of a compressor to a cathode of said fuel cell stack;
calculate a recirculation valve flow setpoint value for a gas flow to a recirculation valve from said outlet of said compressor using a compressor map and said stack cathode flow setpoint, wherein said recirculation valve fluidly connects said outlet of said compressor to an inlet of said compressor;
calculate a feedforward term corresponding to a new recirculation valve position by using said recirculation valve flow setpoint value;
generate a feedback term corresponding to said new recirculation valve position through a PID control strategy based on an error between said stack cathode flow setpoint and said feedback term; and
generate a recirculation valve control command based on said feedforward term and said feedback term that causes actuation of said recirculation valve to maintain cathode stoichiometry during said operational transient.

9. The controller of claim 8, wherein compressor operational data corresponding to said compressor map is contained within said memory and configured such that a gas flow setpoint for said compressor inlet is determined by said controller.

10. The controller of claim 9, wherein said instructions further cause said at least one processor to calculate a difference between said compressor inlet gas flow setpoint and said stack cathode flow setpoint to determine said recirculation valve flow setpoint value.

11. The controller of claim 9, wherein said changed position of said recirculation valve is determined by a feedforward value and at least one of an integral value and a derivative value within said controller.

12. The controller of claim 8, wherein said recirculation valve control command generated by said controller is in signal communication with said recirculation valve to facilitate repositioning thereof.

13. A vehicular fuel cell system comprising:
a fuel cell stack comprising a plurality of fuel cells each of which include a cathode;
a compressor having an inlet and an outlet, wherein said outlet is fluidly connected to said stack to provide a reactant gas to said cathodes;
a recirculation valve operatively connected to said inlet and said outlet of said compressor; and
a cathode stoichiometry controller comprising at least one processor and a non-transitory memory in signal communication with said at least one processor, wherein said memory stores instructions that, when executed by said at least one processor, cause said at least one processor to:
identify a transition of an output of said fuel cell stack;
receive a stack cathode flow setpoint for gas flow to said cathodes;
calculate a recirculation valve flow setpoint value for a gas flow to said recirculation valve using operational data pertaining to said compressor and said stack cathode flow setpoint; and
generate a recirculation valve control command that causes said recirculation valve to change positions valve to maintain cathode stoichiometry during said operational transient.

14. The system of claim 13, wherein said operational data pertaining to said compressor is based on a compressor map.

15. The system of claim 14, wherein said operational data from said compressor map is used to determine a gas flow setpoint to said compressor inlet.

16. The system of claim 13, wherein said instructions that cause said at least one processor to calculate a recirculation valve flow setpoint value further comprise instructions to have said at least one processor:
calculate a feedforward term corresponding to a new recirculation valve position by using said recirculation valve flow setpoint value; and
generate a feedback term corresponding to said new recirculation valve position through a PID control strategy based on an error between said stack cathode flow setpoint and said feedback term.

17. The system of claim 13, further comprising data communication equipment configured to convey said recirculation valve control command between said controller and said recirculation valve.

18. The method of claim 1, wherein the compressor recirculation valve is configured to mitigate surge conditions when said fuel cell stack is in a steady-state condition.

19. The controller of claim 8, wherein the compressor recirculation valve is configured to mitigate surge conditions when said vehicle fuel cell stack is in a steady-state condition.

20. The system of claim 13, wherein the compressor recirculation valve is configured to mitigate surge conditions when said fuel cell stack is in a steady-state condition.

* * * * *